United States Patent [19]

Acker

[11] Patent Number: 4,506,693

[45] Date of Patent: Mar. 26, 1985

[54] PRESSURE REGULATING VALVE

[75] Inventor: Richard C. Acker, Chagrin Falls, Ohio

[73] Assignee: Teledyne Industries, Inc., Cleveland, Ohio

[21] Appl. No.: 423,840

[22] Filed: Sep. 27, 1982

[51] Int. Cl.³ .................................................. G05D 16/00
[52] U.S. Cl. .................................... 137/116.3; 251/172
[58] Field of Search ...................... 137/116.3; 251/172, 251/174

[56] References Cited

U.S. PATENT DOCUMENTS

| | | | |
|---|---|---|---|
| 1,584,600 | 5/1926 | Black | 251/174 |
| 3,368,793 | 2/1968 | Gundelanger et al. | 251/174 |
| 3,472,484 | 10/1969 | Parker | 251/174 |
| 3,834,664 | 9/1974 | Atkinson | 251/172 |
| 4,217,923 | 8/1980 | Kindersley | 251/174 |
| 4,293,038 | 10/1981 | Evans | 251/172 |

FOREIGN PATENT DOCUMENTS 463738  5/1951  Italy .................................... 251/174

Primary Examiner—Martin P. Schwadron
Assistant Examiner—James R. Shay
Attorney, Agent, or Firm—Pearne, Gordon, Sessions, McCoy, Granger & Tilberry

[57] ABSTRACT

A valve system is disclosed in which sleeves providing an unbalanced area are arranged so that the unbalanced area is exposed to the zone of higher pressure and produces a sealing force between the sealing face of the sleeves and a mating valving surface, which force is a direct function of the difference in the pressure across the seal. Adapter rings are positioned behind each seal and a spring provides an initial light bias on the sleeve to urge it into mating engagement with the valving surface. The adapter ring and sleeve structure is arranged so that all of the sleeves, including those sleeves having an external unbalanced area, may be assembled in the valve body from the end of the sleeve receiving passage remote from the valving surface. The adapter rings also make it possible to use standard length sleeves in combination with relatively low cost adapter rings having lengths selected to provide a total sleeve adapter ring length which matches the length of the passages in the valve body.

5 Claims, 3 Drawing Figures

PRESSURE REGULATING VALVE

BACKGROUND OF THE INVENTION

This invention relates generally to pressure-biased valves or the like, and more particularly to a valve system of such type incorporating novel and improved differential area pressure-biased valve sleeves.

PRIOR ART

Zero leakage or very low leakage valves often employ a differential area sleeve which engages the mating valve surface with a force or pressure which is a direct function of the pressure being sealed. U.S. Pat. No. 3,324,887 (assigned to the assignee of this invention) discloses one such valve system. In such valve, the case or housing is at exhaust pressure; therefore, in each instance, the sleeves provide a seal between an internal zone of higher pressure and an external zone of lower pressure. Such sleeves provide an internal, radially extending, unbalanced or differential area facing in a direction away from the valve slide, which is exposed to the higher internal pressure and produces a force on the sleeve urging it into contact with the valve slide with a force which is a direct function of the pressure being sealed. Because the differential area, or unbalanced area, is internal in each instance, all of the sleeves can be assembled into the valve body passages from the end remote from the valve slide.

In other instances, the valve case or housing is not at exhaust pressure. An example of such a device is illustrated in FIG. 3, which is also prior art. This prior art system is a pressure regulator in which the case pressure in zone 10 is the regulated pressure and is above exhaust pressure at port 11. In such a valve, differential area sleeves 12 connect between the valve member 13 and the valve exhaust port 11. and such sleeves, therefore, provide a seal between an external zone of higher pressure and an internal zone of lower pressure. Consequently, the unbalanced or differential area is located externally of the sleeve and is exposed to the zone of higher pressure in order to produce the sealing force on the sleeve, which is a direct function of the differential in the pressures between the external zone and the internal zone.

In the past, as illustrated in FIG. 3, the sleeves at the exhaust ports have been assembled into the valve body from the valve cavity end of the passage in the valve body. Therefore, in such valves, it has been necessary to move the sleeves along the valve cavity to the passages in the body and then insert them in an outward direction along the receiving passage prior to the insertion of the valve member. This is a difficult assembly procedure, and can present severe problems in some instances in which clearances are very limited.

Further, in such prior art devices, the sleeve members must extend substantially the entire length of the passage within the valve body, and it is therefore necessary to custom-manufacture sleeves for each valve body thickness.

SUMMARY OF THE INVENTION

In accordance with the present invention, a novel and improved valving system is provided in which the assembly of the valve sleeve within the valve body can be accomplished in each instance from the exterior of the valve body. Further, in accordance with this invention, adapter rings are provided so that the valve sleeves themselves can be standardized as to length and used in various valve bodies having valve passages of differing lengths. Such adapter rings are arranged to compensate for differences in the length of the valve body passages in which the sleeves are located.

Further in accordance with this invention, the springs utilized to provide an initial bias on the sleeves urging them toward engagement with the valve member are relatively low rate springs which are not as sensitive to tolerance size variations as the relatively high spring rate wave washer type springs often used in the prior art.

These and other aspects of this invention are illustrated in the accompanying drawings, and are more fully described in the following specification.

DETAILED DESCRIPTION OF THE PREFERRED EMBODIMENT

Figure 1:
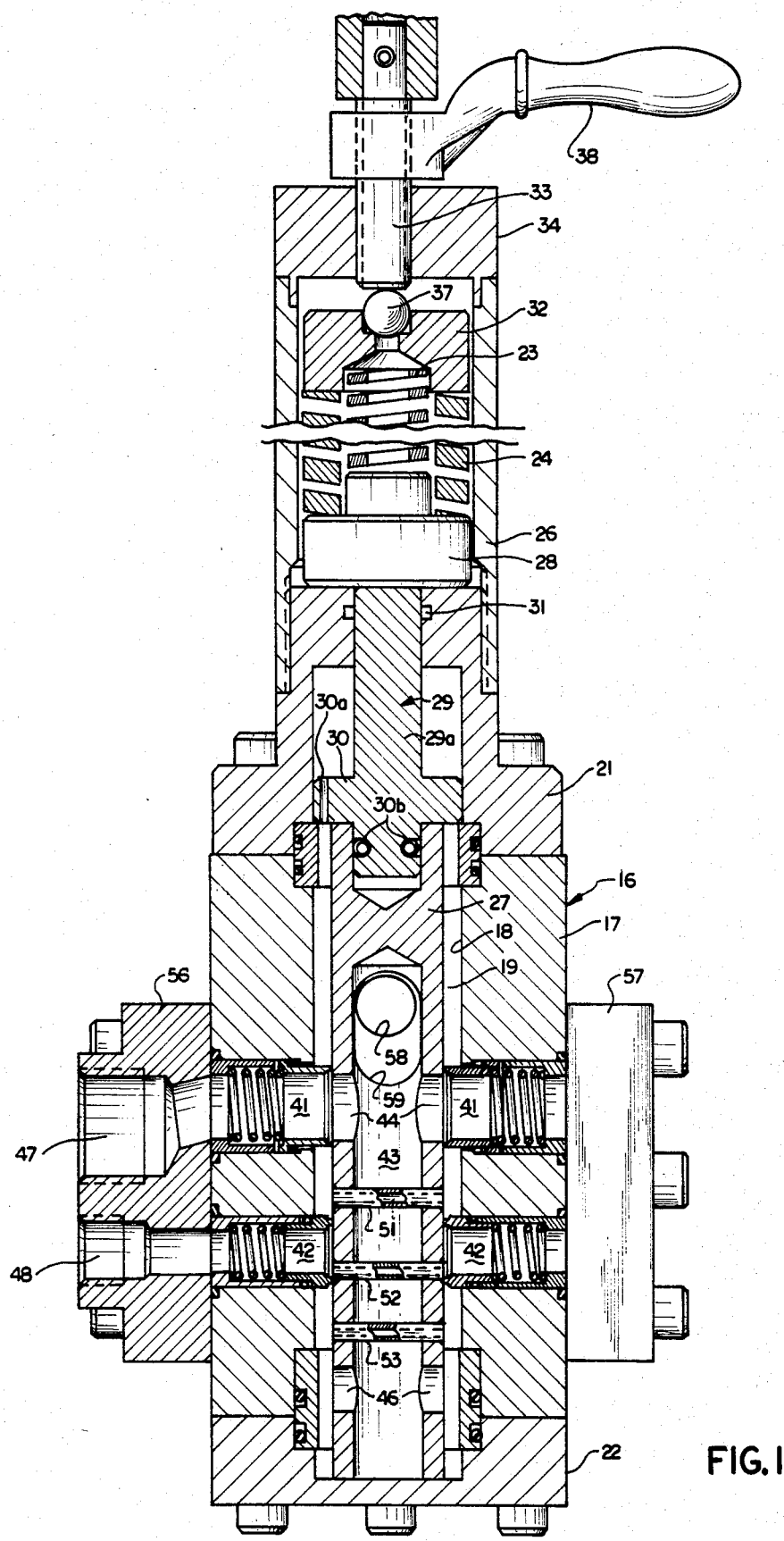
FIG. 1 is a longitudinal section of a pressure regulator incorporating the present invention.

FIG. 1 illustrates a pressure regulator incorporating this invention. Such regulator is intended for establishing and maintaining relatively high regulated pressures, e.g., in the order of 1500 psi, when supplied with pressure in the order of 3000 psi. Further, the regulator is designed to accommodate fairly high flow rates. The particular regulator illustrated finds its primary use in connection with equipment for the control of blowouts at oil wells or the like.

The regulator provides a valve body assembly 16. Such assembly includes a main body member 17 formed with a longitudinal opening 18 therethrough which defines the valve cavity 19. An upper body cap 21 is bolted to one end of the body member 17 and a lower body cap 22 is bolted to the opposite end thereof.

The particular regulator illustrated provides mechanical springs 23 and 24 to adjustably establish the regulated pressure. It should be understood, however, that other systems for controlling the pressure may be utilized. For example, a pneumatic system may be provided in which an air spring controls the regulated pressure, or a hydraulic system utilizing hydraulic pressure may be used to establish the regulated pressure of the device.

In the illustrated embodiment, the springs 23 and 24 are located within a spring housing 26 threaded onto the end of the upper cap member 21. The springs 23 and 24 apply a spring force to the valve member 27 positioned within the valve cavity 19 for longitudinal movement therein. This spring force is applied by the springs to a thrust member 28, which in turn engages a control member 29 having a cylindrical extension 29a extending through a seal 31 in the upper cap member 21 into engagement with the lower side of the thrust member 28.

The upper ends of the springs 23 and 24 engage a second thrust member 32, which is positioned by a screw 33 threaded through a cap 34 mounted on the upper end of the spring housing 26. A ball 37 is positioned between the screw 33 and the thrust member 32 to minimize friction when the screw is rotated by a handle 38.

The pressure in the valve cavity 19 acts on an unbalanced area of the extension 29a to overcome the force of the springs 23 and 24, and to move to a valve-closed position when the desired regulated pressure is reached. A piston head 30 on the control member 29 is provided with an orifice 30a (or a peripheral slot if desired) to provide damping. Roll pins 30b connect the valve member 27 and the control member 29.

The actual valving function is performed by the coaction between the valve member 27 and an opposed pair of identical inlet valve sleeves 41 and an opposed pair of identical outlet or exhaust valve sleeves 42. The valve member 27 is either rectangular or square in cross section, and is formed with a longitudinal central passage 43 communicating with a pair of lateral inlet ports or passages 44 and a pair of lateral exhaust ports or passages 46. The valve member assumes the position illustrated in FIG. 1 when the pressure within the valve cavity 19 is zero or is substantially below the pressure at which the regulator is set to operate. In such position, the lower end of the valve member 27 engages the lower end cap 22.

Figure 2:
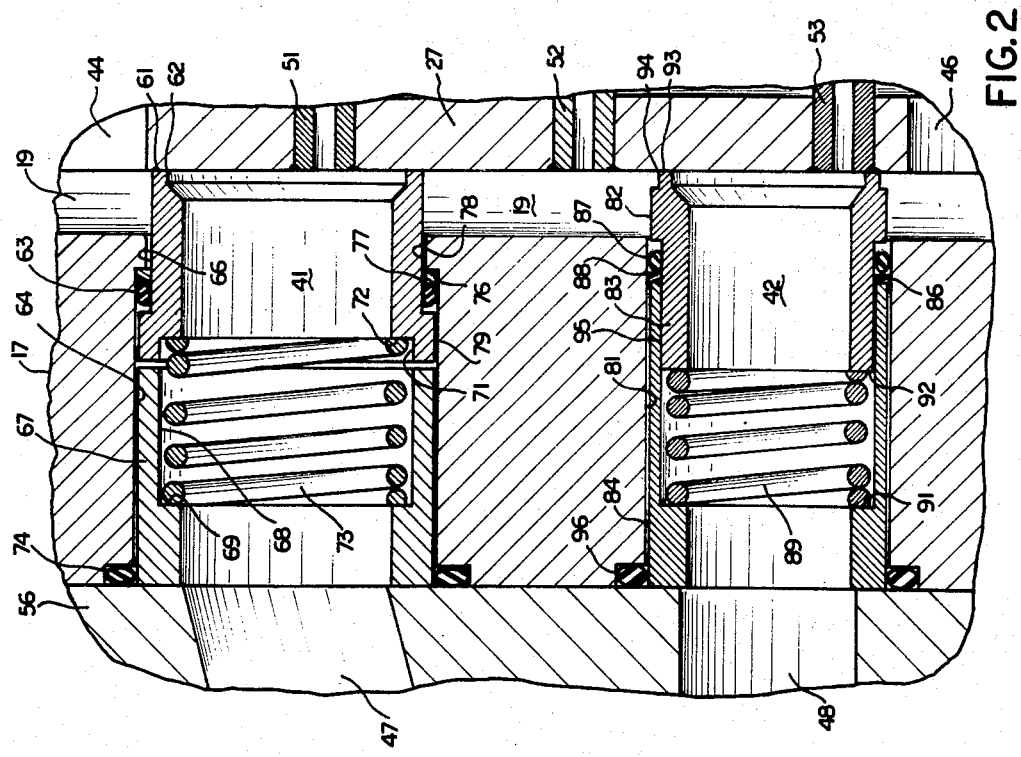
FIG. 2 is an enlarged, fragmentary section illustrating the structure of the inlet and exhaust seals in the regulating position.

When the pressure within the valve cavity 19 builds up, it acts on an unbalanced area of the extension 29a of the control member 29 extending through the seal 31 to overcome the force of the springs 23 and 24, and the valve member 27 raises up until the inlet passages 44 move to a location immediately above and isolated from the inlet valve sleeves 41, as illustrated in FIG. 2. In such condition, inlet pressure supplied to the inlet port 47 is isolated from the valve cavity 19 by the engagement with the inner ends of the valve sleeves 41 and the surface of the valve member 19 spaced from the inlet passages 44. In such condition, the exhaust passages 46 are not yet open to the exhaust sleeves 42, so the cavity 19 is isolated from both the inlet port 47 and the exhaust port 48, and the cavity is at regulated pressure.

If the pressure within the cavity 19 exceeds desired regulated pressure, the valve member 27 moves still further upward, and the exhaust passages 46 move into communication with the exhaust sleeves 42 to reduce the pressure within the cavity 19 to regulated pressure. Once regulated pressure is re-established, the valve member 27 returns to the position of FIG. 2, in which both inlets and outlets are closed. Conversely, if the pressure in the cavity 19 reduces, the valve member moves downwardly under the action of the springs to again establish communication between the passages 44 and the sleeves 41 to supply additional fluid to the regulator and again re-establish the desired regulated pressure.

Three tubes 51, 52, and 53 extend across the valve member and are open to valving faces thereof to ensure that the pressures within the two opposed valve sleeves 41 are always equal, and similarly that the pressures within the two opposed valve sleeves 42 are always equal. This ensures that the valve is laterally balanced at all times.

The inlet port 47 and the exhaust port 48 are formed in a side plate 56 which is bolted onto one side of the main valve body 17, and an opposite side plate 57, which in the illustrated embodiment does not contain any ports, is bolted on the opposite side of the valve member 17 to back up the sleeves on that side of the valve. It should be understood that additional ports can be provided on the right side by an appropriate replacement of the valve plate 57. The regulated pressure within the valve cavity 19 is open to a controlled pressure port 58 in the valve body. Preferably, an elongated, lateral passage 59 is provided to the valve member to ensure full communication between the central passage 43 and the controlled pressure port 58.

Reference should now be made to FIG. 2, which is an enlarged, fragmentary section illustrating the details of structure of the inlet and exhaust sleeves 41 and 42, respectively. It should be understood that the two inlet sleeves 41 are identical and opposite, and that the associated elements which work with each inlet sleeve 41 are also identical. Similarly, the two opposed exhaust sleeves 42 are identical along with the associated elements. Therefore, this detailed description of one inlet sleeve assembly and one exhaust sleeve assembly illustrated in FIG. 2 applies equally to the opposed corresponding sleeves and associated elements.

During the operation of the regulator once regulation is achieved, the pressure within the inlet port 47 is always greater than the regulated pressure within the valve cavity 19. Similarly, during regulation, the pressure within the valve cavity 19 always exceeds the pressure in the exhaust port 48. The inlet sleeve 41 is therefore provided with an unbalanced area open to the interior of the sleeve which is exposed to the higher pressure therein and produces a force on the sleeve 41 in the direction toward the valve member 27. Such force is a direct function of the difference in pressure between the interior of the sleeve 41 and the valve cavity 19.

Since valves of this type do not provide any measurable leakage, and are considered to be zero leakage valves, the pressure drop across the forward face 61 of the inlet valve sleeve 41 occurs at the inner edge of such face at 62. A seal 63 provides a fluidtight joint between the inner surface of the passage 64 within the body member 17 and the exterior surface of the sleeve 66 on the valve sleeve 41. This seal 63 provides dynamic sealing with the surface 66, so that the effective area of the seal 63 is an area encompassed within the diameter 66. The differential or unbalanced area is the difference between the area of a circle having the diameter 66 and the area of a circle having the diameter 63. This area, being unbalanced, results in a fluid-induced force on the sleeve 41 in a direction to the right as viewed in FIG. 2, because the unbalanced or differential area is exposed to the higher internal pressure within the sleeve. Such force is considered to be substantially equal to the unbalanced differential area times the difference in pressure across the seal.

Positioned immediately behind the inlet sleeve 41 is an adapter ring 67 which is formed with a counterbore 68 providing a shoulder 69. A similar counterbore 71 in the inlet sleeve provides a shoulder 72 opposed to the shoulder 69. A light spring 73 extends between the two shoulders and provides a light, resilient force urging the inlet sleeve to the right as viewed in FIG. 2 to initiate contact. The force of this spring, however, is not intended to supply any material sealing force, but merely maintains light engagement to ensure that the pressure-induced force will be created as the pressure differential builds up.

A seal 74 provides a seal between the valve body 17 and the side plate 56. The inner end of the passage 64 is formed with an inwardly directed shoulder providing a face 76 against which a backup ring 77 seats to position the seal 63. Such shoulder joins with an inner wall 78 which closely fits the forward end of the inlet sleeve 41 and the rearward portion at 79 closely fits the main passage 64 within the body. Therefore, the sleeve 41 is installed in the body from the outer end of the passage 64 and the adapter tube or sleeve 67 is then inserted along with the spring 73 from the outer end. Because the sleeve 41, spring 43, and adapter tube 67 can be assembled from the outer end of the passage 64, it is easy to install the sleeve and its associated elements.

The exhaust sleeves 42 are also assembled from the exterior of the associated passages. The exhaust sleeves 42 are positioned within a passage 81 formed in the valve body 17 and provide a forward portion 82 which closely fits such passage. Rearwardly of the portion 82, the valve sleeve 42 is formed with a reduced diameter, rearward extension 83. An adapter sleeve 84 is positioned within the passage or bore 81 with a close fit, and extends to a forward end 86 located between the rearward extension of the sleeve and the walls of the passage 81. A seal 87 and backup ring 88 are positioned adjacent to and are located by the forward end 86 of the adapter tube 84 to provide a fluidtight joint between the wall of the bore 81 and the extension 83. Here again, the spring 89 extends between a shoulder 91 on the adapter tube 84 and the rearward end at 92 of the exhaust sleeve to ensure initial engagement between the forward end or sealing face 93 of the sleeve 42.

In this instance, the pressure within the valve cavity 19 is greater than the pressure within the sleeve 42, so an unbalanced area is located on the exterior of the sleeve to produce the fluid-induced force for sealing. Because the pressure surrounding the sleeve is greater than the internal pressure, the pressure drop occurs at the outer edge of the end face 93 at 94. The diameter of such edge at 94 is greater than the diameter of the exterior surface 95 of the extension 83. Consequently, the differential area, which is the area of the circle having a diameter 94 minus the area of the circle having the diameter of 95, is exposed to the higher pressure within the cavity 19 and produces a force on the sleeve urging it to the right as viewed in FIG. 2. This force is a direct function of the difference in pressure between the two sides of the sleeve 42 times such differential area. Since the maximum diameter of the sleeve 42 is as small as the diameter of the bore 41, the sleeve 42 can also be positioned in the valve from the outer end of the bore 81. Similarly, the spring 89 and the adapter tube 84 are positioned from the exterior or the outer end of the bore 81. Here again, a seal 96 provides a fluidtight joint between the body member 17 and the side plate 56.

In addition to providing the advantage of allowing the assembly of the exhaust sleeve from the exterior of the valve body, after the valve member 27 is installed, the adapter sleeves or tubes 67 and 84 permit the use of standard lengths of inlet and exhaust sleeves 41 and 42, respectively, and variations in the wall thickness of the valve body are accommodated by variations in the length of the adapter tubes 67 and 84. This further reduces the manufacturing cost of the completed valve because the adapter tubes need not be formed with as much precision as the sleeves. It should be understood that the forward ends of the sleeves must be accurately produced to a very good finish so that proper sealing is achieved with the surface of the valve member 27 and dimensional tolerances must be very closely held to ensure proper unbalanced areas.

Figure 3:
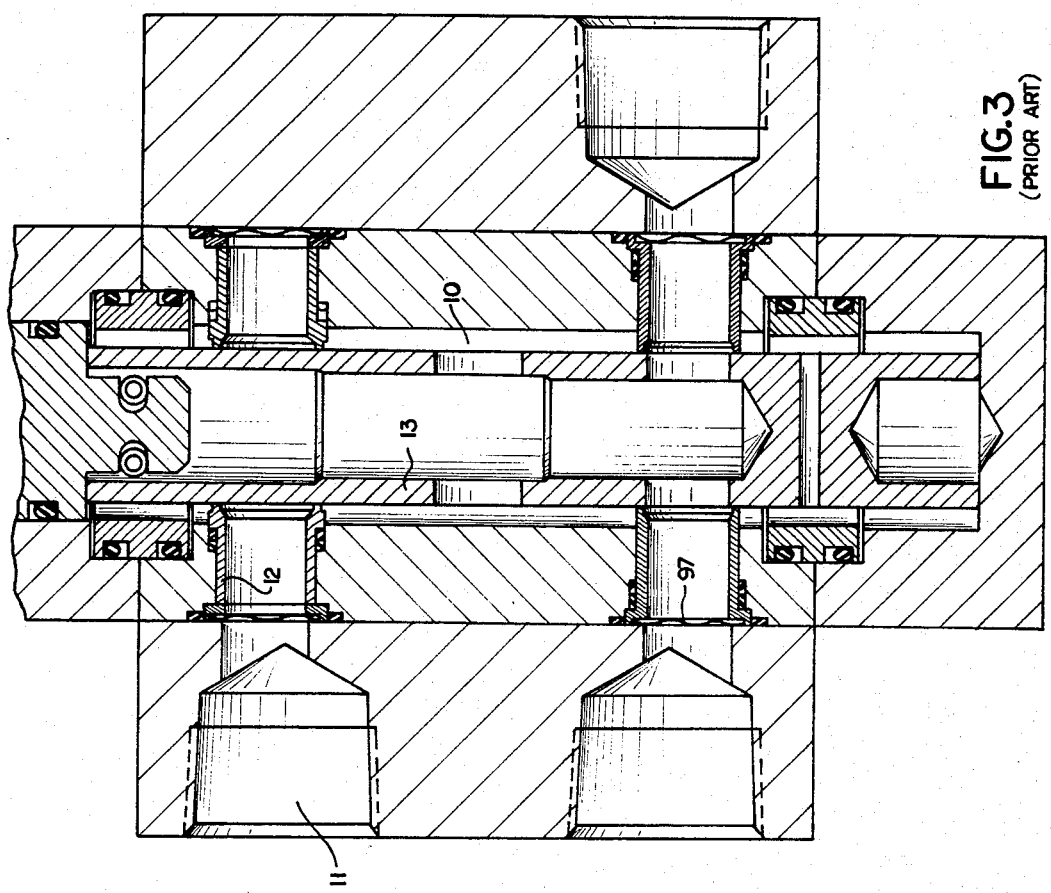
FIG. 3 is a fragmentary, longitudinal section of one form of prior art device.

Further, the structure in most instances permits the use of simple coil springs having a relatively low spring rate to back up the respective sleeves instead of the relatively high spring rate of wave springs 97 of the prior art, as illustrated in FIG. 3. This further reduces the precision required to produce a valve and permits the use of wider tolerances in the manufacture of the tubes 67 and 84.

Although the preferred embodiment of this invention has been shown and described, it should be understood that various modifications and rearrangements of the parts may be resorted to without departing from the scope of the invention as disclosed and claimed herein.

What is claimed is:

1. A valve comprising a body member defining a valve chamber, a valve member movable within said chamber, said valve member providing a planar valve surface with valve ports open through said valve surface, said body member providing passages therein aligned with said valve ports when said valve member is in predetermined positions, differential area sleeves in said passages engaging and sealing with said valve surface and operating to control fluid flow between said passages and associated ports in response to movement of said valve member, first seal means arranged to expose a first one of said sleeves to an associated external pressure higher than an associated internal pressure, second seal means arranged to expose a second one of said sleeves to an associated internal pressure higher than an associated external pressure, said first sleeve providing a radially extending surface, facing in a direction away from said valve surface and hydraulically unbalanced from the absence of an equal effective radially extending surface facing in a direction towards said valve surface, which is exposed to the associated higher external pressure and which produces a force of engagement between said first sleeve and said valve surface which is a direct function of the differential between external and internal pressures associated with said first sleeve, said second sleeve providing a radially extending surface, facing in a direction away from said valve surface and hydraulically unbalanced from the absence of an equal effective radially extending surface facing in a direction towards said valve surface, which is exposed to the associated higher internal pressure and which produces a force of engagement between said second sleeve and said valve surface which is a direct function of the differential between external and internal pressures associated with said second sleeve, said first and second sleeves and associated seal means being insertable into their respective passages from the ends thereof remote from said valve surface, an adapter ring providing a seal retaining surface, said retaining surface locating said first seal means in sealing engagement with the exterior of said first sleeve, said adapter ring being insertable into said passage from the end thereof remote from said valve surface, said adapter ring providing a tubular portion extending between the wall of the associated passage and the outer surface of a portion of said first sleeve, the end of said tubular portion providing said retaining surface.

2. A valve as set forth in claim 1, wherein the associated passage provides a uniform minimum diameter substantially along its entire length.

3. A valve as set forth in claim 2, wherein a spring extends between said first sleeve and adapter ring resiliently urging said first sleeve into contact with said valve surface.

4. A valve as set forth in claim 3, wherein said spring is a coil spring having a relatively low spring rate whereby tolerance variations of said first sleeve and adapter ring do not cause material differences in the force provided by said spring.

5. A valve as set forth in claim 2, wherein a similar sleeve, ring and passage structure is provided on opposite sides of said valve member which operate to balance the lateral forces applied to said valve member.

* * * * *